US007531806B2

(12) United States Patent
Song

(10) Patent No.: US 7,531,806 B2
(45) Date of Patent: May 12, 2009

(54) CARGO CONTAINER CRANING APPARATUS EQUIPPED WITH RADIATION DETECTION DEVICE

(76) Inventor: Shipeng Song, Room 708, Building 29, Jingtian, South Futian District, Shenzhen (CN) 518044

( * ) Notice: Subject to any disclaimer, the term of this patent is extended or adjusted under 35 U.S.C. 154(b) by 23 days.

(21) Appl. No.: 11/692,190

(22) Filed: Mar. 28, 2007

(65) Prior Publication Data

US 2008/0105823 A1 May 8, 2008

(30) Foreign Application Priority Data

Apr. 14, 2006 (CN) ........................ 2006 1 0060347
Apr. 25, 2006 (CN) ........................ 2006 1 0060379

(51) Int. Cl.
*G01F 23/00* (2006.01)

(52) U.S. Cl. ................................ 250/358.1; 250/336.1

(58) Field of Classification Search ............... 250/336.1
See application file for complete search history.

(56) References Cited

U.S. PATENT DOCUMENTS 5,638,420 A * 6/1997 Armistead ................... 378/57
2003/0201394 A1* 10/2003 Peoples ................... 250/336.1
2007/0276619 A1* 11/2007 Sugahara et al. .............. 702/82

* cited by examiner

*Primary Examiner*—David P Porta
*Assistant Examiner*—Marcus H Taningco
(74) *Attorney, Agent, or Firm*—Matthias Scholl P.C.; Matthias Scholl

(57) ABSTRACT

The invention teaches a cargo container craning apparatus comprising a crane; a trolley mounted flexibly on the crane; a spreader attached to the trolley by a suspension rope; a drive mechanism capable of moving the trolley; and a radiation detection device. The radiation detection device serves to detect the contents of the container while the container is being transferred and comprises a support frame; a detector frame; and a radiation detector being disposed on the detector frame; wherein the support frame is aligned with the spreader and is suspended by a suspension rope; and the detector frame is disposed on one side of the support frame. The radiation detection device allows ascertaining whether any hazardous radioactive materials are present in the container. The addition of a radiation body to the radiation detection device allows for radio-imaging of the container contents.

6 Claims, 6 Drawing Sheets

CARGO CONTAINER CRANING APPARATUS EQUIPPED WITH RADIATION DETECTION DEVICE

CROSS-REFERENCE TO RELATED APPLICATIONS

Pursuant to 35 U.S.C § 119 and the Paris Convention Treaty, this application claims the benefits of Chinese Patent Application No. 200610060347.0 filed Apr. 14, 2006, and Chinese Patent Application No. 200610060379.0 filed Apr. 25, 2006, the contents of both of which are incorporated herein by reference.

BACKGROUND OF THE INVENTION

1. Field of the Invention

This invention relates to a craning apparatus for cargo containers, and specifically to a craning apparatus equipped with a detection device for detecting the contents of cargo containers.

2. Description of the Related Art

Conventional craning apparatus for moving cargo containers does not allow for simultaneous transfer and content detection. Usually, separate detection facilities are needed to detect content of cargo containers. This is inefficient and costly. Accordingly, much opportunity remains in the field of craning apparatus design.

SUMMARY OF THE INVENTION

It is one objective of the invention to provide a cargo container craning apparatus comprising: a crane; a trolley mounted flexibly on the crane; a spreader attached to the trolley by a suspension rope; a drive mechanism capable of moving the trolley; and a radiation detection device.

In certain embodiments of the invention, the radiation detection device comprises a support frame; a detector frame; and a radiation detector being disposed on the detector frame; wherein the support frame is aligned with the spreader and is suspended by a suspension rope; and the detector frame is disposed at one side of the support frame.

In certain embodiments of the invention, a first travel rail is disposed on a first side of the support frame; and the detector frame is engaged with the first travel rail, and can be moved along the support frame by the drive mechanism.

In certain embodiments of the invention, the cargo container craning apparatus further comprises a computer imaging system.

In certain embodiments of the invention, the radiation detection device further comprises a radiation body being disposed on the detector frame; a second travel rail is disposed on a second side of the support frame; the detector frame is engaged with the second travel rail, and can be actuated along the support frame by the drive mechanism; the radiation body is engaged on the travel rail of the support frame corresponding to the travel rail engaged by the detector frame; and the detector frame and the radiation body can be actuated synchronously along the support frame by the drive mechanism.

In certain embodiments of the invention, the computer imaging system produces images according to information detected by the radiation detection device.

In certain embodiments of the invention, the cargo container craning apparatus further comprises a means for aligning the spreader and the support frame, the means for aligning being disposed on the support frame.

Figure 1:
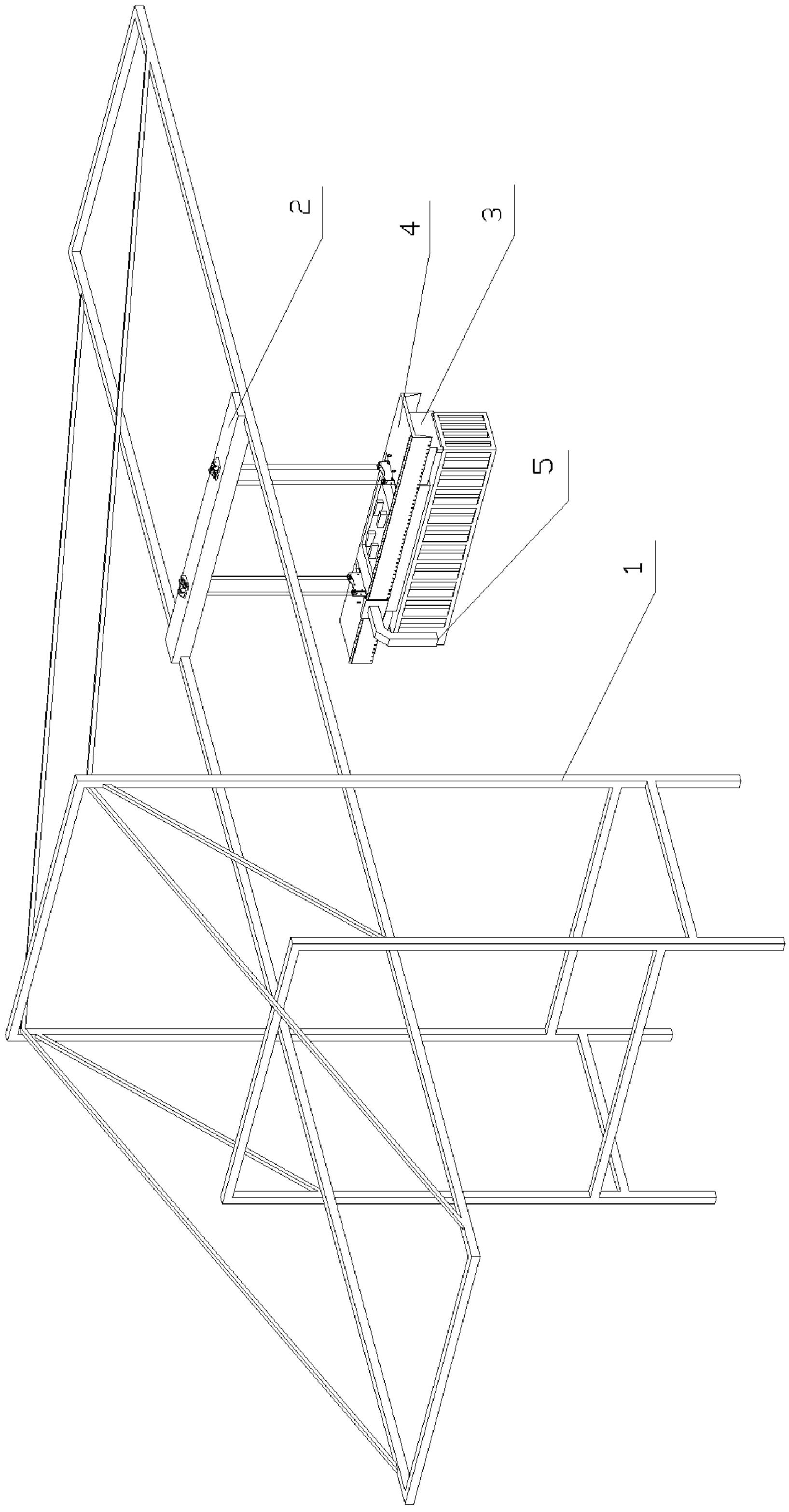
FIG. 1 is a perspective view of a container craning apparatus showing a spreader engaged with a container in accordance with one embodiment of the invention.

The reference numbers of the various parts shown in the drawings are listed below, in which: crane corresponds to the number 1; trolley—2; spreader—3; support frame—4; travel rail—41; detector frame—5; radiation body—6; positioning mechanism—7; drive mechanism—8; suspension rope—9; and thread rope—10.

DETAILED DESCRIPTION OF THE INVENTION

As shown in FIG. 1, a container craning apparatus comprises a crane 1, a trolley 2 mounted flexibly on the crane 1, and a drive mechanism. The drive mechanism drives the trolley 2 in a transverse direction. A spreader 3 suspended from the trolley 2 on the suspension rope 9 serves to grip a container allowing the container to be transferred by moving the trolley.

Figure 2:
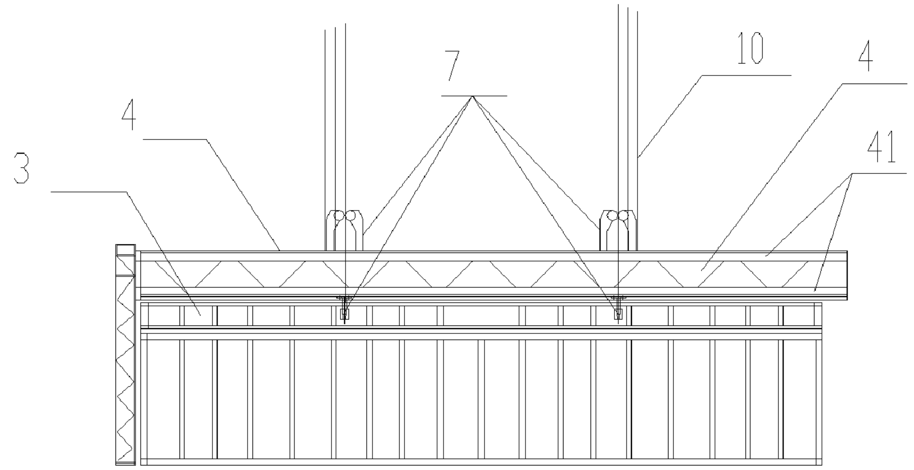
FIG. 2 is a transverse structural view thereof.
Figure 3:
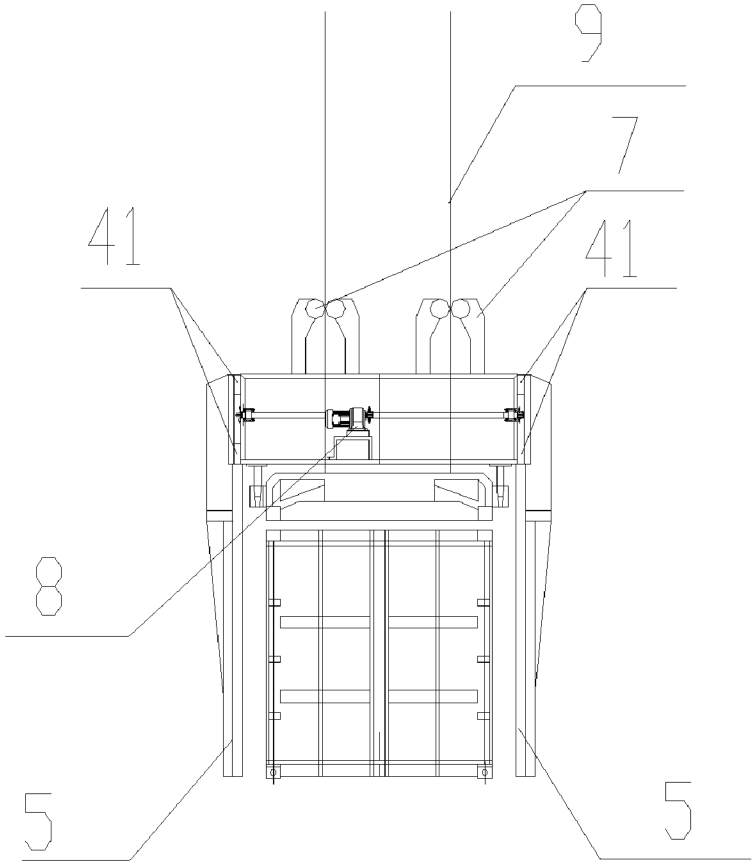
FIG. 3 is a longitudinal structural view thereof.

As shown in FIGS. 2-3, a radiation detection device set on the trolley 2 detects and inspects the contents of the container simultaneously during the transfer of the container by the trolley. The radiation detection device comprises a support frame 4, a detector frame 5 with a detector, and a drive mechanism 8. The support frame 4 matches with the spreader 3 and is suspended to the trolley 2 by means of suspension rope 10. A pair of travel rails 41 is disposed at both sides of the support frame 4. The detector frame 5 is engaged on the travel rail 41 of the support frame 4, and can be moved along the travel rail 41 when driven by the drive mechanism 8. A plurality of positioning mechanisms 7 is further disposed on the support frame 4 to position the spreader 3 and the support frame 4 together. The positioning mechanisms 7 for positioning the spreader 3 and the support frame 4 together are an example of the means 7 for aligning the spreader and the support frame. Optionally, the support frame 4 can be formed with the spreader 3 as one body.

Figure 4:
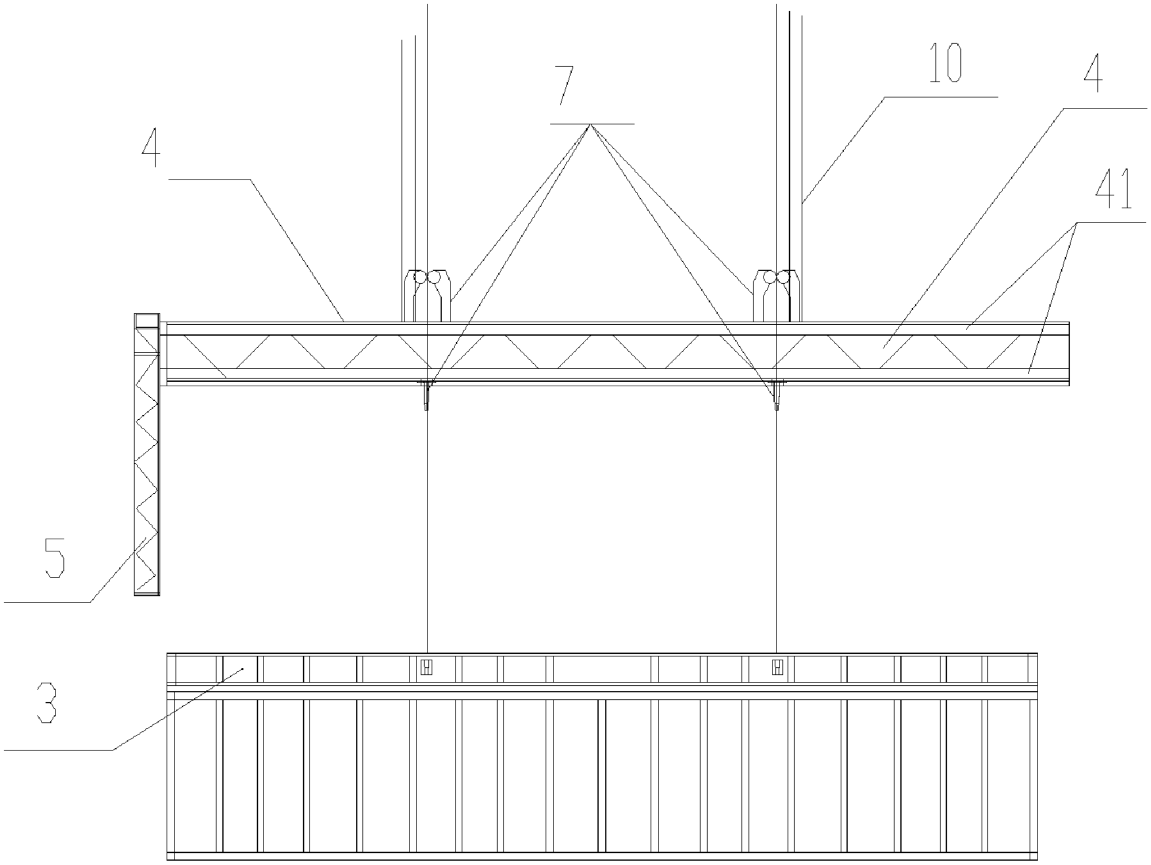
FIG. 4 is a transverse structural view a container craning apparatus showing a spreader disengaged with a container in accordance with one embodiment of the invention.
Figure 5:
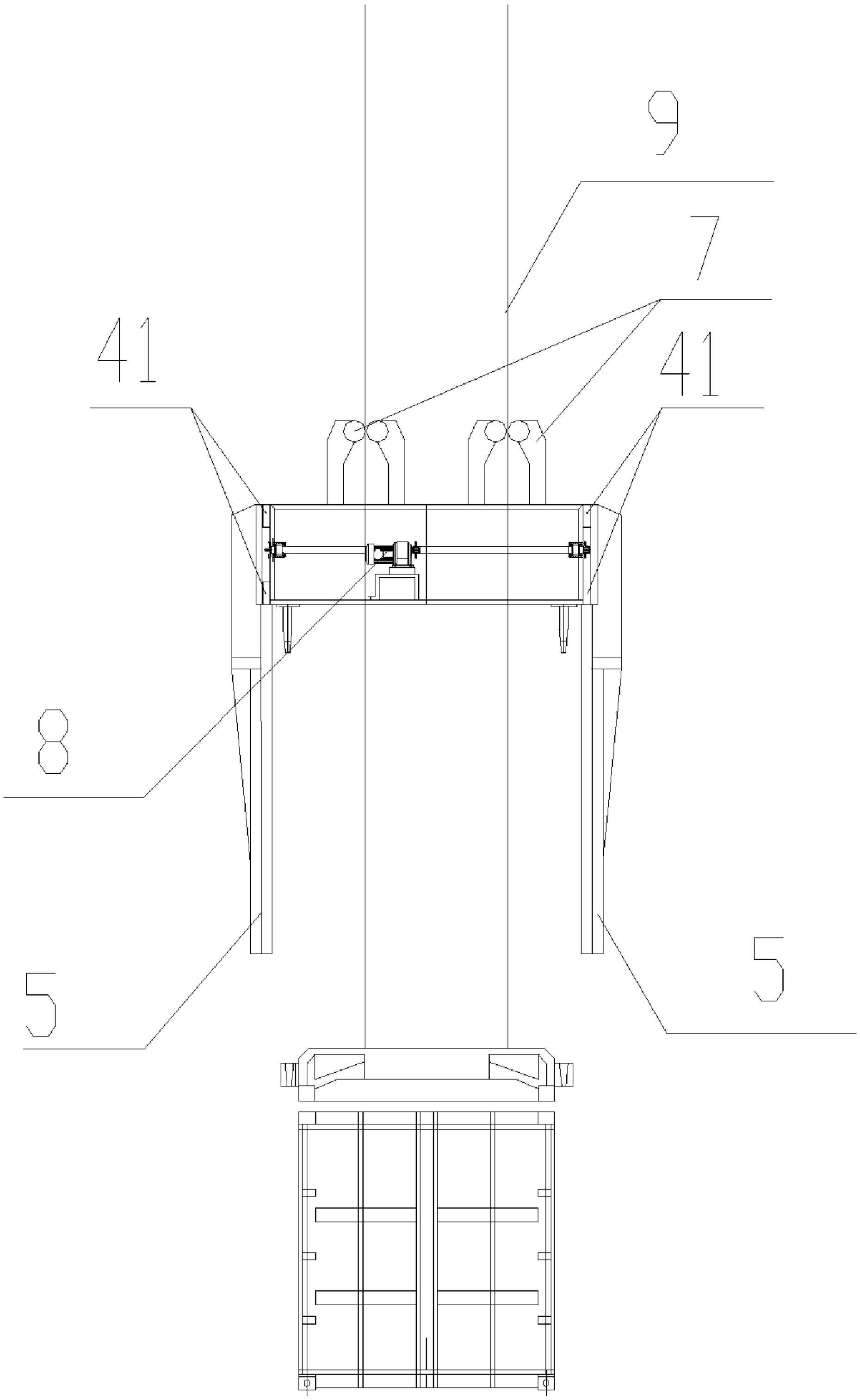
FIG. 5 is a longitudinal structural thereof.

In a process for unloading a cargo container from a ship, the operation of the cargo container craning apparatus is described as follows. (1) As shown in FIGS. 4-5, the radiation detection device is suspended at a certain height, while the spreader drops down continuously to grip the container on the ship, and then, after gripping the container, moves back up; (2) The spreader moves up to the corresponding position of the radiation detection device, and by operation of the positioning mechanism, the radiation detection device starts to operate and moves at the same time as the trolley; (3) The radiation detection device sends the detected characteristics of the container to a system database for storage and processing.

Figure 6:
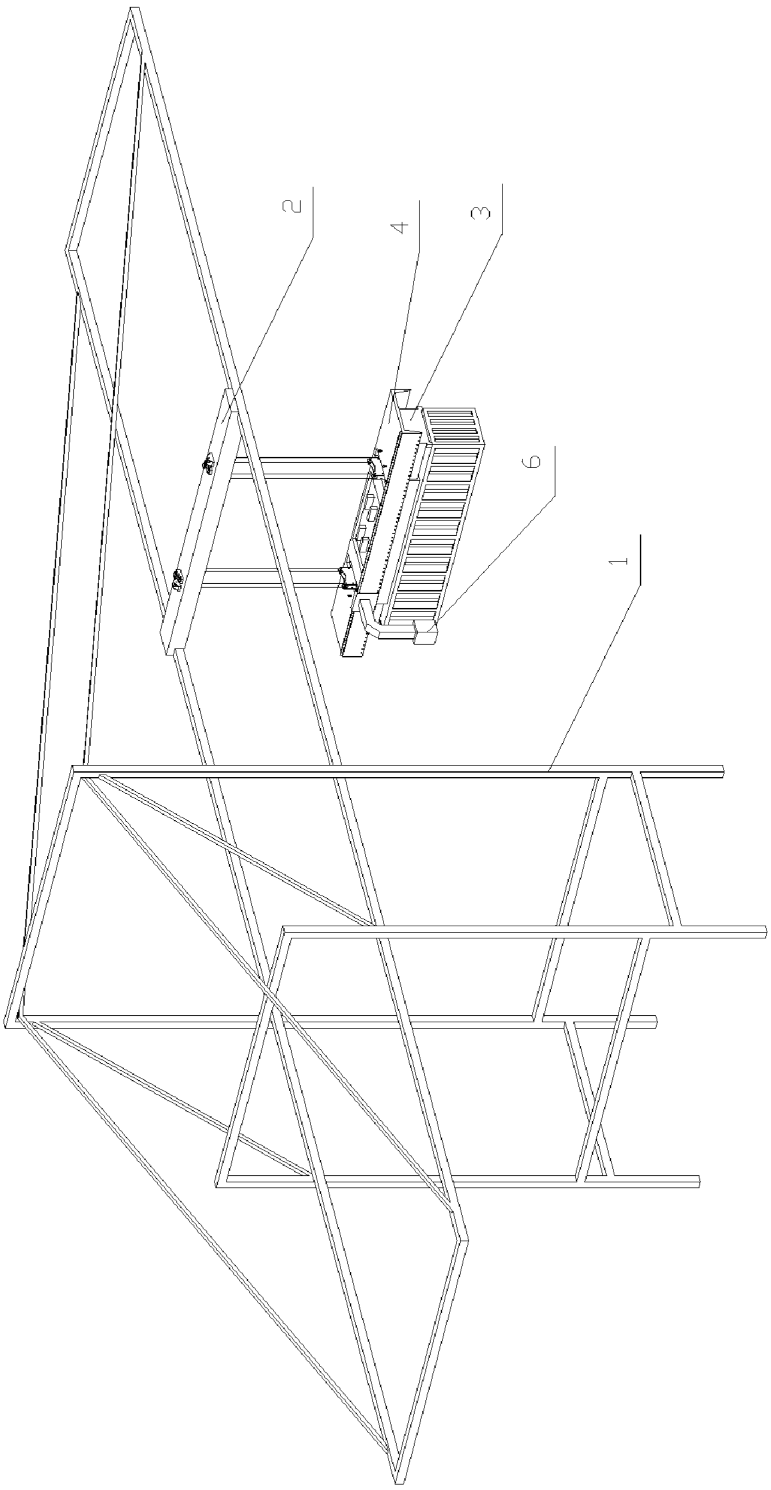
FIG. 6 is a perspective view of a container craning apparatus showing a spreader engaged with a container in accordance with another of the invention.
Figure 7:
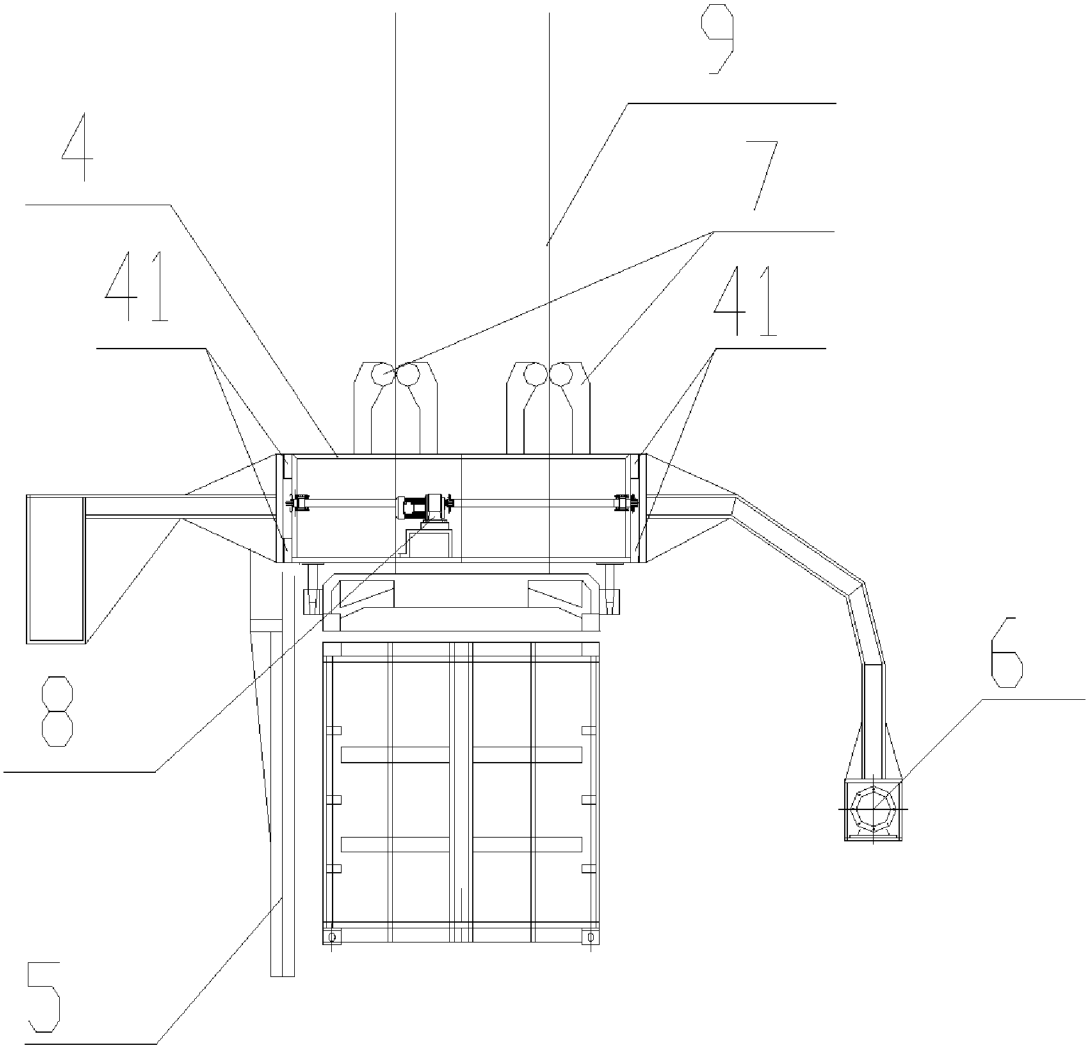
FIG. 7 is a longitudinal structural view thereof.

As shown in FIGS. 6-7, in accordance with a second embodiment of the invention, the cargo container craning apparatus further comprises a computer imaging system. A plurality of travel rails is disposed on both sides of the support frame. A detector frame 5 with a detector is disposed on the travel rail at one side of the support frame, while a radiation body 6 is disposed on the other travel rail of the support frame. The detector frame 5 and the detection body 6 move synchronously along the support frame while being driven by the drive mechanism 8. The computer imaging system generates images according to the information data detected by means of the detector and the radiation body.

What is claimed is:

1. A cargo container craning apparatus comprising: a crane; a trolley mounted flexibly on said crane; a spreader attached to said trolley by a suspension rope; a drive mechanism capable of moving said trolley; a radiation detection device; and a means for aligning said spreader and said support frame; wherein said radiation detection device comprises a support frame; a detector frame; and a radiation detector being disposed on said detector frame; wherein said support frame is aligned with said spreader and is suspended by a suspension rope; said detector frame is disposed at one side of said support frame; and said means for aligning is disposed on said support frame.

2. The apparatus of claim 1, wherein a first travel rail is disposed on a first side of said support frame; and said detector frame is engaged with said first travel rail, and can be moved along said support frame by said drive mechanism.

3. The apparatus of claim 2, further comprising a computer imaging system.

4. The apparatus of claim 3, wherein said radiation detection device further comprises a radiation body being disposed on said detector frame; a second travel rail is disposed on a second side of said support frame; said detector frame is engaged with said second travel rail, and can be actuated along said support frame by said drive mechanism; said radiation body is engaged on the travel rail of the support frame corresponding to the travel rail engaged by the detector frame; and said detector frame and said radiation body can be actuated synchronously along the support frame by said drive mechanism.

5. The apparatus of claim 4, wherein said computer imaging system produces images according to information detected by said radiation detection device.

6. A cargo container craning apparatus comprising: a crane; a trolley mounted flexibly on said crane; a spreader attached to said trolley by a suspension rope; a drive mechanism capable of moving said trolley; a radiation detection device comprises a support frame; a detector frame and a radiation detector being disposed on said detector frame; and a plurality of positioning mechanisms to position the spreader and the support frame; wherein said support frame is aligned with said spreader and is suspended by a suspension rope; said detector frame is disposed at one side of said support frame; and said plurality of positioning mechanisms is disposed on said support frame.

* * * * *